(12) United States Patent
Johnson

(10) Patent No.: US 7,131,905 B2
(45) Date of Patent: Nov. 7, 2006

(54) METHOD AND APPARATUS FOR SPIRAL CUTTING A TUBULAR MEAT PRODUCT

(76) Inventor: Terrance Johnson, 17210 Olcott Ave., Tinley Park, IL (US) 60477

( * ) Notice: Subject to any disclaimer, the term of this patent is extended or adjusted under 35 U.S.C. 154(b) by 0 days.

(21) Appl. No.: 10/870,822

(22) Filed: Jun. 17, 2004

(65) Prior Publication Data

US 2005/0279203 A1 Dec. 22, 2005

Related U.S. Application Data

(60) Provisional application No. 60/479,807, filed on Jun. 18, 2003.

(51) Int. Cl.
*A22C 17/00* (2006.01)
(52) U.S. Cl. .................................................... 452/102
(58) Field of Classification Search .............. 83/856, 83/857, 858; 452/102–105
See application file for complete search history.

(56) References Cited

U.S. PATENT DOCUMENTS

| | | | | |
|---|---|---|---|---|
| 3,703,918 A | * | 11/1972 | Borner | 83/425.3 |
| 3,890,867 A | * | 6/1975 | Wilson | 83/404 |
| 4,212,431 A | * | 7/1980 | Doyel | 241/100 |
| 4,570,519 A | * | 2/1986 | Motosko, II | 83/856 |
| 4,573,387 A | * | 3/1986 | Denter et al. | 83/856 |
| 4,733,588 A | * | 3/1988 | Yamamoto | 83/857 |
| 5,148,731 A | * | 9/1992 | Boerner | 83/857 |
| 5,745,999 A | * | 5/1998 | Zirkiev | 30/278 |
| 6,805,044 B1 | * | 10/2004 | Yamamoto | 99/537 |

* cited by examiner

*Primary Examiner*—Thomas Price
(74) *Attorney, Agent, or Firm*—Paul Schaafsma; Novus IP, LLC

(57) ABSTRACT

One aspect of the present invention relates to the spiral cutting of a meat product. The meat product is spirally cut to produce a food item that will cook more evenly, retain condiments better, fit a standard bun, and is healthier. In addition, a food item prepared in accordance with the present invention will be more pleasant to the gustatory senses.

12 Claims, 2 Drawing Sheets

METHOD AND APPARATUS FOR SPIRAL CUTTING A TUBULAR MEAT PRODUCT

RELATED APPLICATION

This application is based on Provisional patent Application No. 60/479,807 titled, "Method and Apparatus for Spiral Cutting a Tubular Meat Product" filed on 18 Jun. 2003.

FIELD OF THE INVENTION

The present invention relates to the cutting of food, more particularly the spiral cutting of a tubular meat product.

BACKGROUND OF THE INVENTION

Sausages and related meat products having an outer skin have many well known problems. The typical method for cooking them is to apply direct heat which unless done with extreme care, results in rupturing of the meat product and uneven cooking. Further, the methods of cooking retain much of the fat, producing an high fat food product. Additionally, the skin of the meat products often presents an unpleasant gustatory sensation due to the rubbery sensation on the teeth.

There is a need for a method and device to prepare processed meat products to cook evenly, better retain condiments and fit a standard bun. Processed meat products also need a method and device to prepare them in a healthier manner resulting in a more gustatorily pleasing food item.

SUMMARY OF THE INVENTION

One aspect of the present invention relates to the spiral cutting of a meat product. The meat product is spirally cut to produce a food item that will cook more evenly, retain condiments better, fit a standard bun, and is healthier. In addition, a food item prepared in accordance with the present invention will be more pleasant to the gustatory senses.

DETAILED DESCRIPTION OF THE INVENTION

Figure 1:
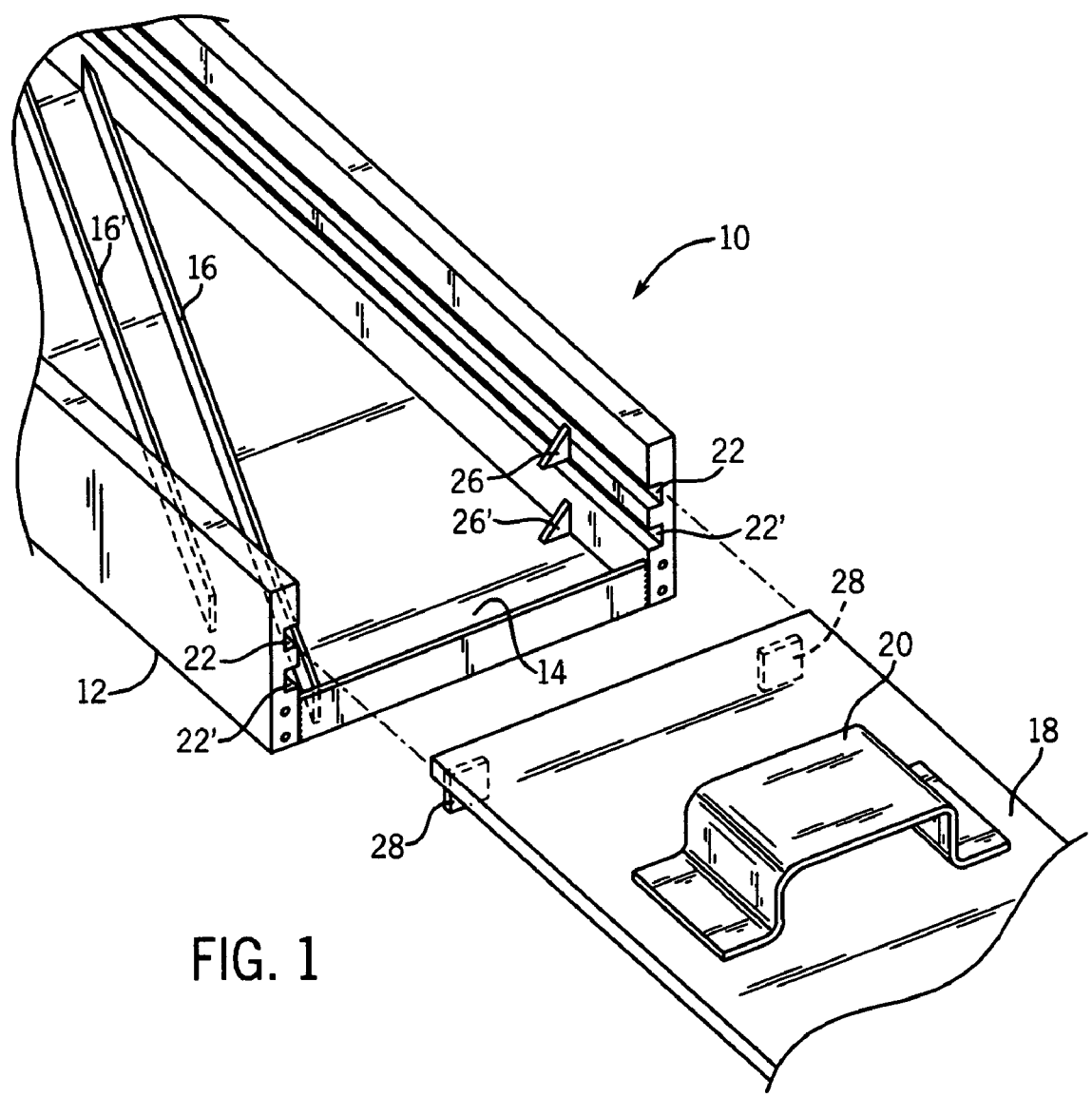
FIG. 1 is a perspective of one embodiment of the present invention showing the base and the blade.

With reference to FIG. 1, one aspect of the present invention is a device for spirally cutting tubular meat products 10. The cutting device 10 comprises a base 12. The base 12 includes a top surface defining a plane 14. The base 12 further includes at least one blade 16 disposed diagonally within. In another embodiment, a second blade 16' can be provided parallel with the first blade 16. The blade 16 is positioned relative to the base 12 so as to provide a cutting edge which is above the plane 14 of the base 12. The cutting edge is aligned substantially orthogonal to the plane 14 of the base 12. When the relative movement of the tubular meat product with respect to the blade 16 results in the cutting edge of the blade 16 contacting the tubular meat product at a point that rotates in relation to the motion to the tubular meat product forming a spiral cut.

The cutting device 10 further comprises a means for moving the tubular meat product relative to the blade 16. In a preferred embodiment, the movement means is a guide member 18 which frictionally engages the tubular meat product. The guide member 18 is adapted to slidably engage the base 12. To this end, the base defines at least one guide slot 22 into which the guide member 18 engages. In one embodiment, more than one guide slot 22' are provided to accommodate different diameter tubular meat products. The base 18 can provide stops 26, 26'. In one embodiment, the guide member can provide tabs 28.

Figure 2:
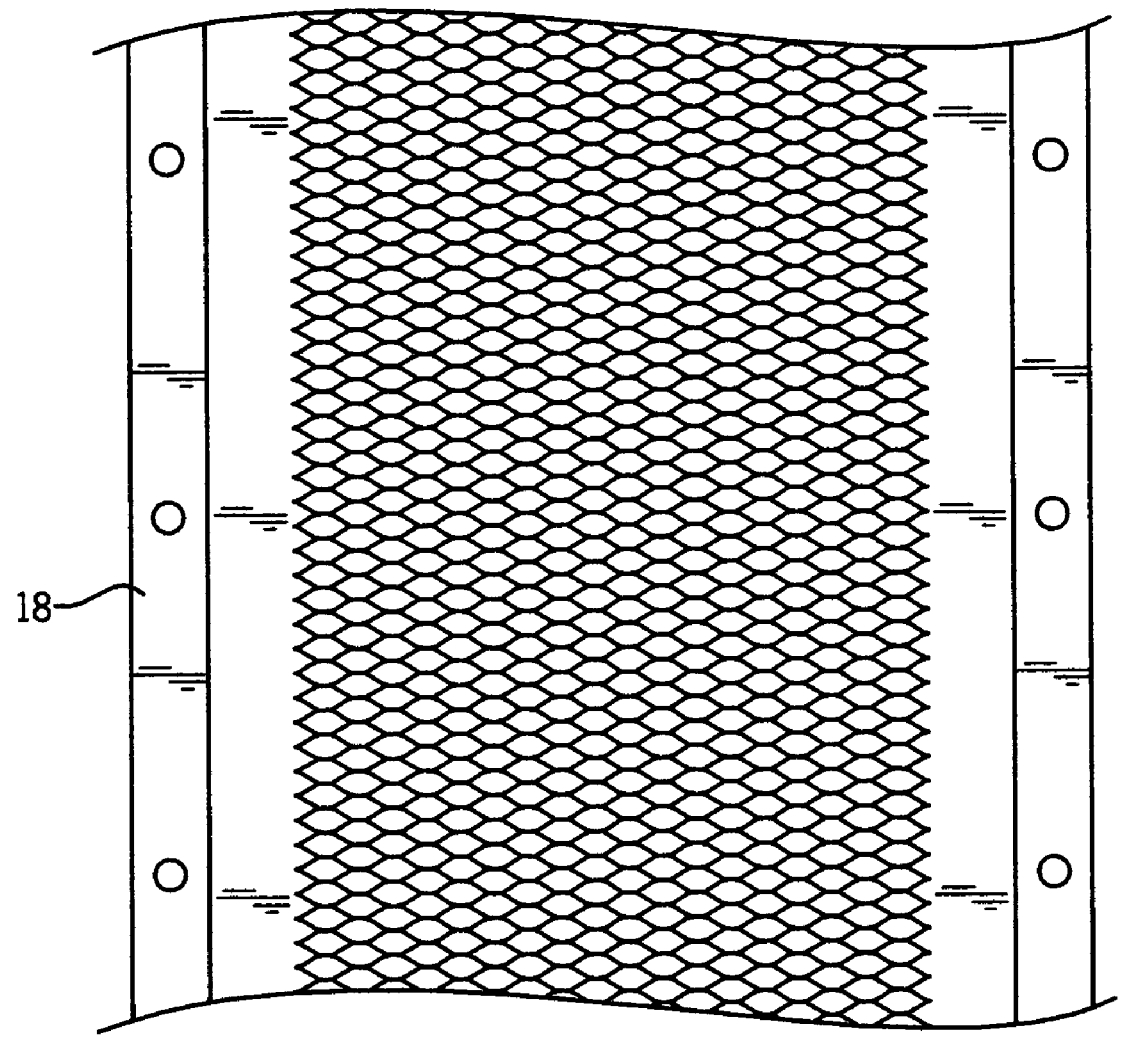
FIG. 2 is a perspective view one embodiment of the present invention showing the guide member having a bottom surface design to frictionally engage the meat product.

The relative motion of guide member 18 engaging the tubular meat product and the base 12 may be generated by any means known in the art, for example but not limited to manual means and mechanical means. In one embodiment directed to manual generation, the guide member includes a handle 20. Additionally, the guide member 18 may engage the tubular meat product using any means known in the art, for example but not limited to frictional forces and normal forces. Referring to FIG. 2, the guide member 18 may have a lower surface 24 having a high coefficient of friction. In one embodiment, this frictional surface comprises a food grade metal screen.

One aspect of the present invention concerns a method for spirally cutting a meat product. The meat product is positioned on a base having a blade disposed diagonally in the base. The meat product is rolled relative the blade.

While the invention has been described with specific embodiments, other alternatives, modifications and variations will be apparent to those skilled in the art. For example, one of ordinary skill in the art would appreciate that any means for moving the meat product relative to the blade could be utilized. All such alternatives, modifications and variations are intended to be included within the spirit and scope of the appended claims.

What is claimed is:

1. A device for spiral cutting of a meat product comprising:
   a base including a top surface defining a plane;
   a blade disposed diagonally within the base, the blade positioned relative to the base so as to provide a cutting edge that extends perpendicularly to the plane of the base and above the plane of the base; and
   means for moving the tubular meat product relative to the blade; such that relative movement of the tubular meat product or the blade or both results in the cutting edge of the blade contacting the tubular meat product at a point that rotates in relation to the motion to the tubular meat product forming a spiral cut.

2. The device for spiral cutting of a meat product of claim 1 further including a second blade provided parallel with the first blade, the second blade extending perpendicularly to the plane of the base and above the plane of the base.

3. The device for spiral cutting of a meat product of claim 1 further wherein the movement means is a guide member which frictionally engages the tubular meat product.

4. The device for spiral cutting of a meat product of claim 3 further wherein the guide member is moved manually.

5. The device for spiral cutting of a meat product of claim 3 further wherein the base defines a guide slot into which the guide member engages.

6. The device for spiral cutting of a meat product of claim 5 further wherein more than one guide slot is provided to accommodate different diameter tubular meat products.

7. A method for spiral cutting of a meat product comprising:
   positioning the meat diagonally relative to a cutting edge, the cutting edge extending perpendicularly to the plane of the base; and
   rolling the meat product relative the cutting edge; such that relative movement of the tubular meat product or the cutting edge or both results in the cutting edge contacting the tubular meat product at a point that rotates in relation to the motion to the tubular meat product forming a spiral cut.

8. The method of spiral cutting of a meat product of claim 7 further including positioning the meat on a base including a top surface defining a plane and a blade disposed diagonally within the base.

9. The device for spiral cutting of a meat product of claim 7 further including manually rolling the meat product.

10. The method of spiral cutting of a meat product of claim 7 further including providing a second cutting edge parallel with the first cutting edge, the second cutting edge extending perpendicularly to the plane of the base.

11. The method of spiral cutting of a meat product of claim 7 further including rolling the meat product relative the cutting edge with a guide member which frictionally engages the tubular meat product.

12. The method of spiral cutting of a meat product of claim 11 further including engaging the guide member with the base in a guide slot defined in the base.

* * * * *